US012620079B2

(12) United States Patent
Li et al.

(10) Patent No.: US 12,620,079 B2
(45) Date of Patent: May 5, 2026

(54) YOLOv5-BASED REAL-TIME DETECTION METHOD AND DEVICE FOR BLADE CRACKS IN AEROENGINE OPERATION AND MAINTENANCE

(71) Applicant: Civil Aviation University of China, Tianjin (CN)

(72) Inventors: Shuangbao Li, Tianjin (CN); Jingyi Yu, Tianjin (CN)

(73) Assignee: CIVIL AVIATION UNIVERSITY OF CHINA, Tianjin (CN)

( * ) Notice: Subject to any disclaimer, the term of this patent is extended or adjusted under 35 U.S.C. 154(b) by 260 days.

(21) Appl. No.: 18/576,275

(22) PCT Filed: Sep. 19, 2022

(86) PCT No.: PCT/CN2022/119657
§ 371 (c)(1),
(2) Date: Jan. 3, 2024

(87) PCT Pub. No.: WO2023/036346
PCT Pub. Date: Mar. 16, 2023

(65) Prior Publication Data
US 2024/0212124 A1      Jun. 27, 2024

(30) Foreign Application Priority Data
Sep. 13, 2021    (CN) .......................... 202111068098.0

(51) Int. Cl.
*G06T 7/00*          (2017.01)
*G06T 3/4046*        (2024.01)
(Continued)

(52) U.S. Cl.
CPC .......... *G06T 7/0004* (2013.01); *G06T 3/4046* (2013.01); *G06V 10/7715* (2022.01);
(Continued)

(58) Field of Classification Search
CPC ................. G06T 7/0004; G06T 3/4046; G06T 2207/20081; G06T 2207/20084;
(Continued)

(56) References Cited

U.S. PATENT DOCUMENTS

2023/0095093 A1* 3/2023 Ye .......................... G06V 10/22
382/159

FOREIGN PATENT DOCUMENTS

CN        112287899 A      1/2021
CN        112581430 A      3/2021
(Continued)

OTHER PUBLICATIONS

International Search Report, PCT/CN2022/119657, Nov. 25, 2022, pp. 1-3.
(Continued)

*Primary Examiner* — Christopher Wait
(74) *Attorney, Agent, or Firm* — Armis IP Law, LLC

(57) ABSTRACT

Provided are a YOLOv5-based real-time detection method and device for blade cracks in aeroengine operation and maintenance. The method includes: sending a first instruction to obtain images of internal blades of an engine; preprocessing the images of the internal blades of the engine to obtain a test dataset, a training dataset, and a validation dataset; inputting the training dataset into a preset YOLOv5 network model for training, preliminarily evaluating a model effect derived from training by using the validation dataset to adjust the model, testing the model by using a trained weight file and the test dataset, and obtaining an mAP value and a precision-recall curve to finally evaluate the model; obtaining the images of the internal blades of the engine in real time, detecting the internal blades of the engine in real time by using the weight file, and outputting a detection result.

8 Claims, 3 Drawing Sheets

(51) Int. Cl.
*G06V 10/77* (2022.01)
*G06V 10/774* (2022.01)
*G06V 10/776* (2022.01)
*G06V 10/82* (2022.01)

(52) U.S. Cl.
CPC .......... *G06V 10/774* (2022.01); *G06V 10/776* (2022.01); *G06V 10/82* (2022.01); *G06T 2207/20081* (2013.01); *G06T 2207/20084* (2013.01); *G06T 2207/30164* (2013.01)

(58) Field of Classification Search
CPC ............ G06T 2207/30164; G06T 7/62; G06V 10/7715; G06V 10/774; G06V 10/776; G06V 10/82; G06N 3/045; G06N 3/08
See application file for complete search history.

(56) References Cited

FOREIGN PATENT DOCUMENTS

| | | |
|---|---|---|
| CN | 112581443 A | 3/2021 |
| CN | 113838013 A | 12/2021 |
| WO | 2020046213 A1 | 3/2020 |

OTHER PUBLICATIONS

Ye, Liwei, et al., "Yolo-v5, (Classroom behavior based on Yolo-v5 improved model Real-time detection method)" (Changing Information & Communications), No. 7, Jul. 31, 2021, pp. 41-45.

* cited by examiner

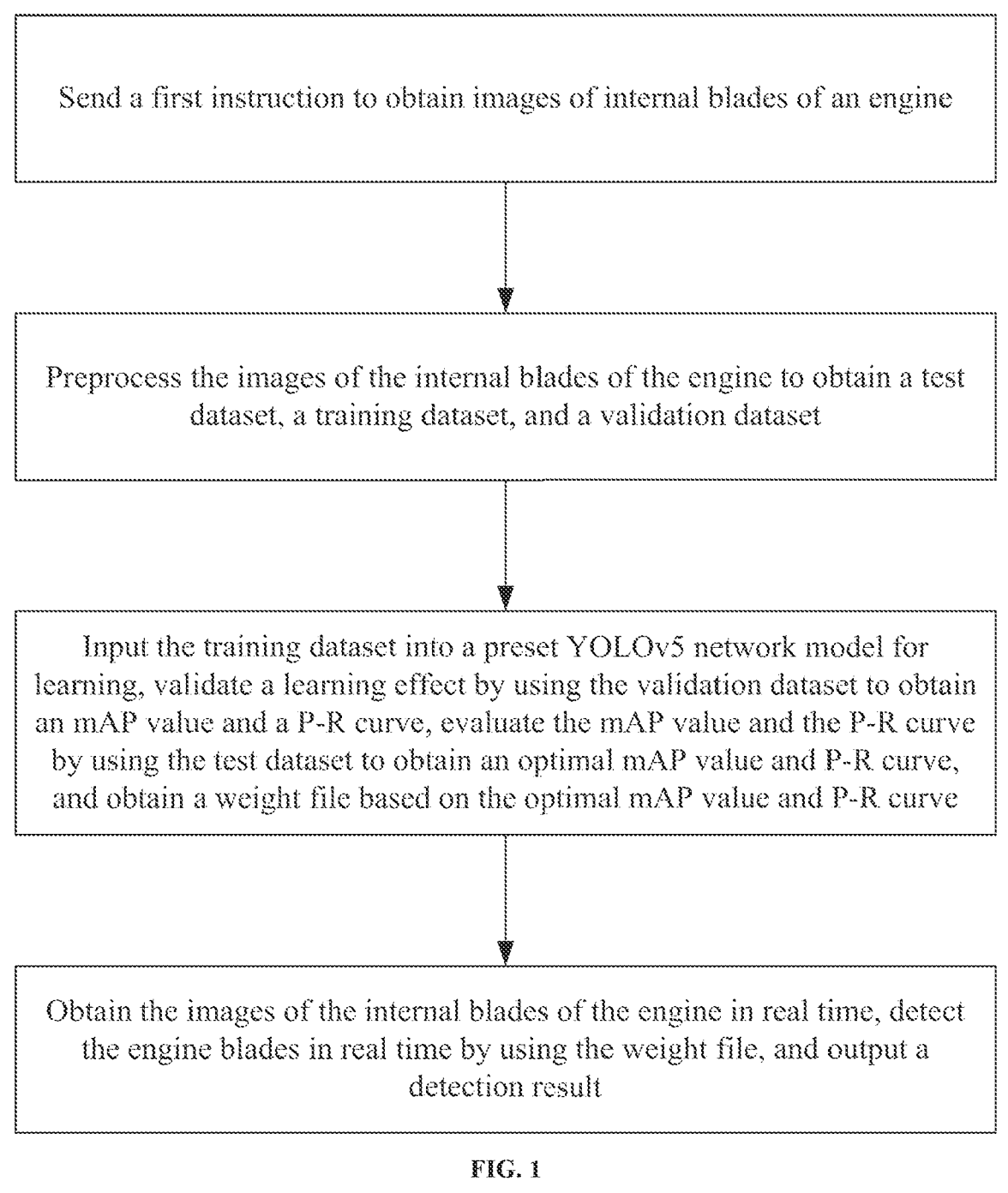

Send a first instruction to obtain images of internal blades of an engine

Preprocess the images of the internal blades of the engine to obtain a test dataset, a training dataset, and a validation dataset Input the training dataset into a preset YOLOv5 network model for learning, validate a learning effect by using the validation dataset to obtain an mAP value and a P-R curve, evaluate the mAP value and the P-R curve by using the test dataset to obtain an optimal mAP value and P-R curve, and obtain a weight file based on the optimal mAP value and P-R curve Obtain the images of the internal blades of the engine in real time, detect the engine blades in real time by using the weight file, and output a detection result

FIG. 1

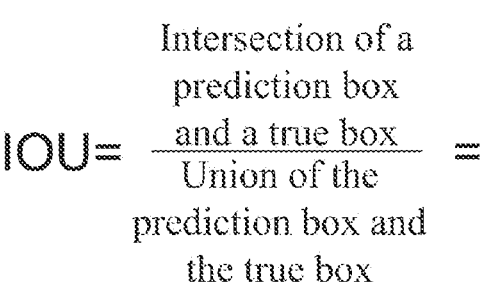
$$IOU = \frac{\text{Intersection of a prediction box and a true box}}{\text{Union of the prediction box and the true box}} =$$
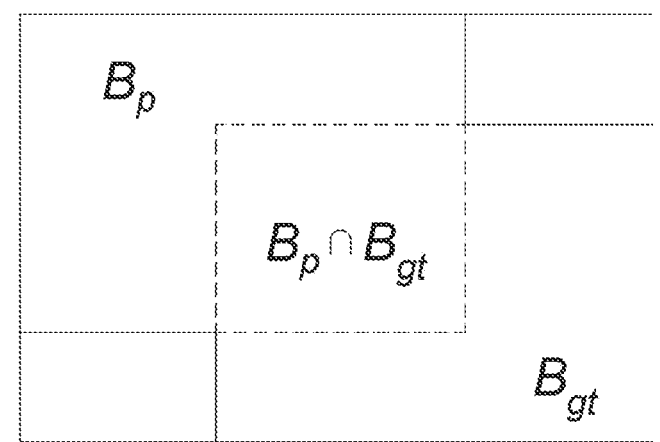
FIG. 2

YOLOv5-BASED REAL-TIME DETECTION METHOD AND DEVICE FOR BLADE CRACKS IN AEROENGINE OPERATION AND MAINTENANCE

CROSS REFERENCE TO RELATED APPLICATION

This patent application is a national stage application of International Patent Application No. PCT/CN2022/119657, filed on Sep. 19, 2022, which claims the benefit and priority of Chinese Patent Application No. 202111068098.0, filed with the China National Intellectual Property Administration on Sep. 13, 2021, the disclosure of which is incorporated by reference herein in its entirety as part of the present application.

TECHNICAL FIELD

The present disclosure relates to the technical field of acro-generator detection, and in particular, a YOLOv5-based real-time detection method and device for blade cracks in aeroengine operation and maintenance.

BACKGROUND

Normal operation of aeroengine blades can provide continuous flight power for an engine, and the aeroengine blades usually have a long service time. In such an environment, the aeroengine blades are likely to generate fatigue cracks, and the cracks on the internal blades of the engine pose a potential threat to the normal operation of the aeroengine. The cracks that are not treated in a timely manner may further deteriorate, which further leads to the paralysis and failure of the entire engine, thereby posing a serious threat to normal aviation flight. In fact, provided that there are cracks on the internal blades of the engine, no matter how big the cracks are, the cracks may endanger people and pose a serious threat to a machine, or even destroy the machine and cause death, resulting in irreparable losses. For a long time, flight accidents caused by turbine blade fracture are common in flight, so it is very important to regularly detect blade cracks to ensure the safe operation of aeroengines.

Existing methods for detecting blade cracks include: conventional methods such as a borescope and penetrant testing method, an X-ray and magnetic particle testing method, eddy current testing, and ultrasonic testing; and image processing methods such as a faster region-based convolutional neural network (R-CNN) two-stage algorithm. The conventional methods mainly have problems such as a limited number of manual marks, poor robustness, many steps in process, time consuming, and labor consuming.

Target detection algorithms fall into one-stage algorithms and two-stage algorithms. The one-stage algorithm is to perform positioning prediction after image information is input, and directly output results, which has a fast detection speed, but there are many anchor boxes, so the selection of anchor boxes needs to be optimized. YOLO is a representative algorithm of one-stage target detection, which outputs a position and category confidence of a target box at one time. The two-stage algorithm classifies and regresses the anchor boxes, and performs detection and update for many times, has a slower speed than the one-stage algorithm, and has a structure not flexible enough, but the network fusion is high.

In summary, in the prior art, the blade crack detection method relies on manual marking, which is inefficient, and the target detection algorithm cannot meet requirements for both the blade detection speed and blade detection network flexibility.

SUMMARY

In view of this, an objective of the present disclosure is to provide a YOLOv5-based real-time detection method and device for blade cracks in aeroengine operation and maintenance, so as to increase a speed of detecting blade cracks in the prior art and improve network flexibility of a blade crack detection algorithm.

In a first aspect, an embodiment of the present disclosure provides a YOLOv5-based real-time detection method for blade cracks in aeroengine operation and maintenance, which is applied to an upper computer, and specifically includes the following steps:

sending a first instruction to obtain images of internal blades of an engine;

preprocessing the images of the internal blades of the engine to obtain a test dataset, a training dataset, and a validation dataset;

inputting the training dataset into a preset YOLOv5 network model for training, preliminarily evaluating a model effect derived from training by using the validation dataset to adjust the model, testing the model by using a trained weight file and the test dataset, and obtaining an mAP value and a precision-recall (P-R) curve to finally evaluate the model; and obtaining the images of the internal blades of the engine in real time, detecting the internal blades of the engine in real time by using the weight file, and outputting a detection result.

Preferably, the step of preprocessing the images of the internal blades of the engine to obtain a test dataset, a training dataset, and a validation dataset includes:

performing crack marking, scaling and folding on the images of the internal blades of the engine to expand datasets to obtain the test dataset, the training dataset, and the validation dataset.

Preferably, the preset YOLOv5 network model includes an input end, a Backbone network, a Neck network, and an output end;

the input end includes a data enhancement module and an anchor box selection module, where the data enhancement module is configured to splice input data in a manner of scaling, cutting and random arrangement, and the anchor box selection module is configured to calculate and update a size of a crack anchor box marked on the images of the internal blades of the engine;

the Backbone network includes a Focus structure, a Conv+BatchNormalization+LeakyRelu (CBL) structure, a cross stage partial (CSP) structure, and a spatial pyramid pooling (SPP) module;

the Focus structure is configured to obtain the crack image at the input end for slicing and parallel convolution operation, and the CBL structure is configured to extract feature information of the crack image subjected to slicing and parallel convolution operation by the Focus structure;

the SPP module is configured to equally divide a feature mapping of crack image features and perform pooling operation;

the Neck network includes a feature pyramid network (FPN) structure and a path aggregation network (PAN) structure, where the FPN structure and the CBL structure increase a size of a feature map of the crack image, and the PAN structure and the FPN structure perform feature fusion to reduce the size of the feature map of the crack image; and the output end is configured to mark crack information and output confidence to obtain precision and recall.

Preferably, the pooling operation is performed by using the following formula:

$$S_H * S_W = \left\lfloor \frac{h + 2p - f}{s} + 1 \right\rfloor * \left\lfloor \frac{w + 2p - f}{s} + 1 \right\rfloor$$

where $S_H$ is a height of a matrix;
$S_W$ is a width of the matrix;
h is the height of the image;
w is the width of the image;
p is a filling quantity;
f is a filter size; and
s is a stride.

Preferably, the precision is obtained by using the following formula:

$$Precision = \frac{TP}{TP + FP} = \frac{TP}{n},$$

where
n is a total number of recognized images;
TP is a number of correctly recognized images; and
FP is a number of wrongly recognized images;
the recall is obtained by using the following formula:

$$Recall = \frac{TP}{TP + FN} = \frac{TP}{m},$$

where
m is a total number images with a target to be recognized; and
FN is a number of images with a target but not recognized by a system.

Preferably, TP and FP are obtained by using the following steps:

obtaining confidence and Intersection over Union (IOU), where the IOU is obtained by using the following formula:

$$IOU = \frac{area\ (B_P \cap B_{gt}).}{area\ (B_P \cup B_{gt})},$$

where
$B_p$ is a prediction box; and
$B_{gt}$ is a true box; and
obtaining TP and FP based on the IOU:
if a recognized region has an area greater than an IOU threshold, determining a result as TP, or if the recognized region has an area less than the IOU threshold, determining the result as FP.

Preferably, the mAP value is obtained by using the following formula:

$$AP = \sum_{k=1}^{N} P(k)\Delta r(k),$$

where
P is precision;
r is recall; and
the mAP value is a mean of AP values of category features.

In another aspect, the present disclosure provides a YOLOv5-based real-time detection device for blade cracks in aeroengine operation and maintenance, including:

an image acquisition instruction sending module, configured to send a first instruction to obtain images of internal blades of an engine;

a sample acquisition module, configured to preprocess the images of the internal blades of the engine to obtain a test dataset, a training dataset, and a validation dataset;

a training test module, configured to input the training dataset into a preset YOLOv5 network model for training, preliminarily evaluate a model effect derived from training by using the validation dataset to adjust the model, test the model by using a trained weight file and the test dataset, and obtain an mAP value and a P-R curve to finally evaluate the model; and an output module, configured to obtain the images of the internal blades of the engine in real time, detect the internal blades of the engine in real time by using the weight file, and output a detection result.

Embodiments of the present disclosure have the following beneficial effects: The present disclosure provides a YOLOv5-based real-time detection method and device for blade cracks in aeroengine operation and maintenance. The method includes the following specific steps: sending a first instruction to obtain images of internal blades of an engine; preprocessing the images of the internal blades of the engine to obtain a test dataset, a training dataset, and a validation dataset; inputting the training dataset into a preset YOLOv5 network model for training, preliminarily evaluating a model effect derived from training by using the validation dataset to adjust the model, testing the model by using a trained weight file and the test dataset, and obtaining an mAP value and a P-R curve to finally evaluate the model; and obtaining the images of the internal blades of the engine in real time, detecting the internal blades of the engine in real time by using the weight file, and outputting a detection result. According to the present disclosure, a speed of detecting blade cracks in the prior art can be increased, and network flexibility of a blade crack detection algorithm can be improved.

Other features and advantages of the present disclosure will be described in the following description, and some of these will become apparent from the description or be understood by implementing the present disclosure. The objectives and other advantages of the present disclosure can be implemented or obtained by structures specifically indicated in the description, claims, and accompanying drawings.

In order to make the above objectives, features, and advantages of the present disclosure clearer and more understandable, the present disclosure is described in detail below using preferred embodiments with reference to the accompanying drawings.

BRIEF DESCRIPTION OF THE DRAWINGS

To describe the technical solutions in the specific implementations of the present disclosure or the prior art more clearly, the accompanying drawings required for describing the specific implementations or the prior art are briefly described below. Apparently, the accompanying drawings in the following description show merely some implementations of the present disclosure, and a person of ordinary skill in the art may still derive other drawings from these accompanying drawings without creative efforts.

FIG. 1 is a flowchart of a YOLOv5-based real-time detection method for blade cracks in aeroengine operation and maintenance according to an embodiment of the present disclosure;

FIG. 2 is a schematic diagram of IOU of a YOLOv5-based real-time detection method for blade cracks in aeroengine operation and maintenance.

DETAILED DESCRIPTION OF THE EMBODIMENTS

Figure 3:
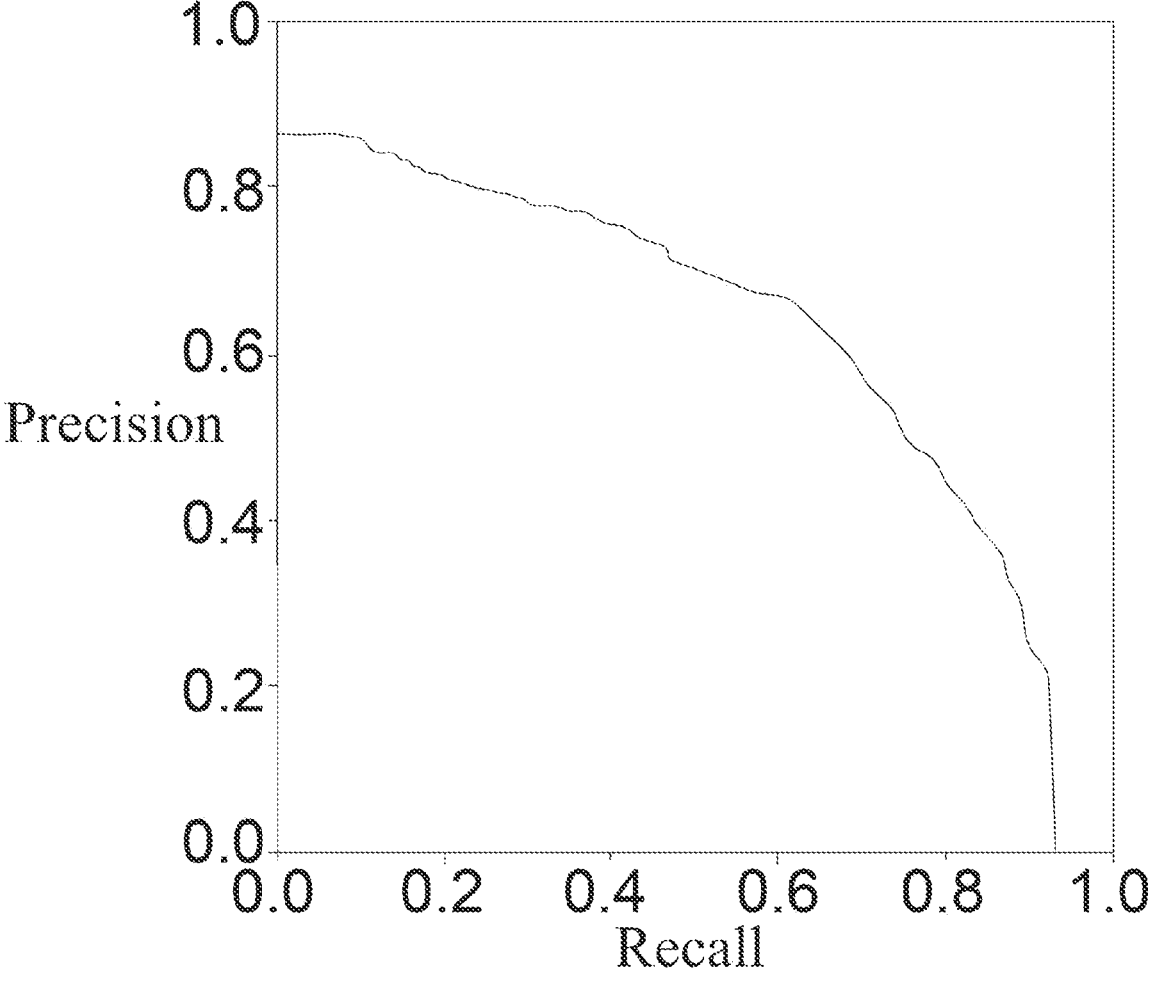
FIG. 3 is a P-R curve of a YOLOv5-based real-time detection method for blade cracks in aeroengine operation and maintenance with an mAP value of 0.625.

In order to make the objectives, technical solutions, and advantages of the embodiments of the present disclosure clearer, the technical solutions in the present disclosure are described clearly and completely below with reference to the accompanying drawings. Apparently, the described embodiments are some rather than all of the embodiments of the present disclosure. All other embodiments obtained by a person skilled in the art based on the embodiments of the present disclosure without creative efforts shall fall within the protection scope of the present disclosure.

Currently, target detection algorithms fall into one-stage algorithms and two-stage algorithms. The one-stage algorithm is to perform positioning prediction after image information is input, and directly output results, which has a fast detection speed, but there are many anchor boxes, so the selection of anchor boxes needs to be optimized. YOLO is a representative algorithm of one-stage target detection, which outputs a position and category confidence of a target box at one time. The two-stage algorithm classifies and regresses the anchor boxes, and performs detection and update for many times, has a slower speed than the one-stage algorithm, and has a structure not flexible enough, but the network fusion is high. In view of this, a YOLOv5-based real-time detection method and device for blade cracks in aeroengine operation and maintenance according to embodiments of the present disclosure can increase a speed of detecting blade cracks in the prior art and improve network flexibility of a blade crack detection algorithm.

To facilitate the understanding of the embodiments, a YOLOv5-based real-time detection method for blade cracks in aeroengine operation and maintenance according to an embodiment of the present disclosure is first described in detail.

Embodiment 1

As shown in FIG. 1, Embodiment 1 of the present disclosure provides a YOLOv5-based real-time detection method for blade cracks in aeroengine operation and maintenance, which is applied to an upper computer, and specifically includes the following steps:

sending a first instruction to obtain images of internal blades of an engine;

preprocessing the images of the internal blades of the engine to obtain a test dataset, a training dataset, and a validation dataset;

inputting the training dataset into a preset YOLOv5 network model for training, preliminarily evaluating a model effect derived from training by using the validation dataset to adjust the model, testing the model by using a trained weight file and the test dataset, and obtaining an mAP value and a P-R curve to finally evaluate the model; and obtaining the images of the internal blades of the engine in real time, detecting the internal blades of the engine in real time by using the weight file, and outputting a detection result.

Preferably, the step of preprocessing the images of the internal blades of the engine to obtain a test dataset, a training dataset, and a validation dataset includes:

performing crack marking, scaling and folding on the images of the internal blades of the engine to expand datasets to obtain the test dataset, the training dataset, and the validation dataset.

Further, a LabelImg image marking tool may be used to expand datasets by folding images in a horizontal direction, a vertical direction or horizontal and vertical directions.

According to the present disclosure, 300 images were obtained and preprocessed to obtain 1,500 images. Specifically, the division of the dataset is as shown in Table 1.

TABLE 1

| Dataset distribution table | | | |
| --- | --- | --- | --- |
| Training dataset | Validation dataset | Test dataset | Total |
| 960 | 240 | 300 | 1500 |
| 1200 | | | |

Preferably, the preset YOLOv5 network model includes an input end, a Backbone network, a Neck network, and an output end;

the input end includes a data enhancement module and an anchor box selection module, where the data enhancement module is configured to splice input data in a manner of scaling, cutting and random arrangement, and the anchor box selection module is configured to calculate and update a size of a crack anchor box marked on the images of the internal blades of the engine;

the Backbone network includes a Focus structure, a CBL structure, a CSP structure, and an SPP module;

the Focus structure is configured to obtain the crack image at the input end for slicing and parallel convolution operation, and the CBL structure is configured to extract feature information of the crack image subjected to slicing and parallel convolution operation by the Focus structure;

the SPP module is configured to equally divide a feature mapping of crack image features and perform pooling operation;

the Neck network includes an FPN structure and a PAN structure, where the FPN structure and the CBL structure increase a size of a feature map of the crack image, and the PAN structure and the FPN structure perform feature fusion to reduce the size of the feature map of the crack image; and the output end is configured to mark crack information and output confidence to obtain precision and recall. The output end includes a Generalized Intersection over Union (GIOU) loss function and non-maximum suppression (NMS). Further, preferably, the pooling operation is performed by using the following formula:

$$S_H * S_W = \left[ \frac{h + 2p - f}{s} + 1 \right] * \left[ \frac{w + 2p - f}{s} + 1 \right]$$

where $S_H$ is a height of a matrix;
$S_W$ is a width of the matrix;
h is the height of the image;
w is the width of the image;
p is a filling quantity;
f is a filter size; and
s is a stride.

Preferably, the precision is obtained by using the following formula:

$$\text{Precision} = \frac{TP}{TP + FP} = \frac{TP}{n},$$

where
n is a total number of recognized images;
TP is a number of correctly recognized images; and
FP is a number of wrongly recognized images;
the recall is obtained by using the following formula:

$$\text{Recall} = \frac{TP}{TP + FN} = \frac{TP}{m},$$

where
m is a total number images with a target to be recognized; and
FN is a number of images with a target but not recognized by a system.

Preferably, TP and FP are obtained by using the following steps:

As shown in FIG. 2, confidence and IOU are obtained, where the IOU is obtained by using the following formula:

$$IOU = \frac{\text{area } (B_P \cap B_{gt})}{\text{area } (B_P \cup B_{gt})},$$

where
$B_p$ is a prediction box; and
$B_{gt}$ is a true box; and
TP and FP are obtained based on the IOU:
if a recognized region has an area greater than an IOU threshold, a result is determined as TP, or if the recognized region has an area less than the IOU threshold, the result is determined as FP.

Preferably, the mAP value is obtained by using the following formula:

$$AP = \sum_{k=1}^{N} P(k) \Delta r(k),$$

where
P is precision;
r is recall; and
the mAP value is a mean of AP values of category features.

Further, classification contents of TP, FP, NP and FN are shown in the following table.

TABLE 2

| Classification contents of TP, FP, NP and FN | | |
| --- | --- | --- |
| | True | |
| Prediction | Positive sample | Negative sample |
| Positive sample | TP (True Positive) | FP (False Positive) |
| Negative sample | NP (True Negative) | FN (False Negative) |

It should be noted that in the embodiment of the present disclosure, the mAP value under the weight file was 0.625. Specific test results are as follows, and a P-R curve is as shown in FIG. 3.

TABLE 3

| Test results in the case of the mAP being 0.625 | | | |
| --- | --- | --- | --- |
| Index | Precision | Recall | mAP |
| Test results | 0.613 | 0.675 | 0.625 |

Embodiment 2

Embodiment 2 of the present disclosure provides a YOLOv5-based real-time detection device for blade cracks in aeroengine operation and maintenance, including:

an image acquisition instruction sending module, configured to send a first instruction to obtain images of internal blades of an engine;

a sample acquisition module, configured to preprocess the images of the internal blades of the engine to obtain a test dataset, a training dataset, and a validation dataset;

a training test module, configured to input the training dataset into a preset YOLOv5 network model for training, preliminarily evaluate a model effect derived from training by using the validation dataset to adjust the model, test the model by using a trained weight file and the test dataset, and obtain an mAP value and a P-R curve to finally evaluate the model; and an output module, configured to obtain the images of the internal blades of the engine in real time, detect the internal blades of the engine in real time by using the weight file, and output a detection result.

Unless otherwise specified, the relative arrangement, numerical expressions and numerical values of components and steps set forth in these embodiments do not limit the scope of the present disclosure.

The device according to the embodiment of the present disclosure has the same implementation principles and technical effects as the foregoing method embodiment. For the simplicity of description, for contents not mentioned in the device embodiment, reference may be made to corresponding contents in the aforementioned method embodiment.

The flowcharts and block diagrams in the accompanying drawings illustrate system architectures, functions and operations that may be implemented by the system, method, and computer program product according to a plurality of embodiments of the present disclosure. Each block in the flowcharts or block diagrams may represent a module, a program segment, or a part of code, and the module, the program segment, or the part of code contains one or more executable instructions used to implement specified logical functions. It should also be noted that, in some alternative implementations, the functions marked in the blocks may alternatively occur in a different order from that marked in the accompanying drawings. For example, two consecutive blocks may actually be executed in parallel, or sometimes may be executed in the reverse order, depending on the functions involved. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

A person skilled in the art can clearly understand that for convenience and brevity of description, reference may be made to corresponding processes in the foregoing method embodiments for specific working processes of the foregoing system and device. Details are not described herein again.

In addition, in the description of the present disclosure, unless otherwise clearly specified and limited, meanings of terms "mount", "connected", and "connection" should be understood in a board sense. For example, the connection may be a fixed connection, a removable connection, or an integral connection; may be a mechanical connection or an electrical connection; may be a direct connection or an indirect connection by using an intermediate medium, or may be intercommunication between two elements. A person of ordinary skill in the art may understand specific meanings of the foregoing terms in the present disclosure based on a specific situation.

In the description of the present disclosure, it should be noted that orientations or position relationships indicated by terms "center", "top", "bottom", "left", "right", "vertical", "horizontal", "inner", "outer" and the like are based on the orientation or position relationships as shown in the accompanying drawings, for ease of describing the present disclosure and simplifying the description only, rather than indicating or implying that the indicated device or element must have a particular orientation or be constructed and operated in a particular orientation. Therefore, these terms should not be understood as a limitation to the present disclosure. Moreover, the terms "first", "second", and "third" are used only for the purpose of description, and are not intended to indicate or imply relative importance.

Finally, it should be noted that the above embodiments are merely specific implementations of the present disclosure, and are used to describe rather than limiting the technical solutions of the present disclosure. The protection scope of the present disclosure is not limited thereto. Although the present disclosure is described in detail with reference to the foregoing embodiments, it should be understood by a person of ordinary skill in the art that any person skilled in the art can still make modifications to or readily figure out changes in the technical solutions described in the foregoing embodiments, or make equivalent substitutions on some technical features therein. These modifications, changes, or substitutions do not make the essence of the corresponding technical solutions depart from the spirit and scope of the technical solutions of the embodiments of the present disclosure, and shall all fall within the protection scope of the present disclosure. Therefore, the protection scope of the present disclosure shall be based on the protection scope of the claims.

What is claimed is:

1. A YOLOv5-based real-time detection method for blade cracks in aeroengine operation and maintenance, applied to an upper computer, and specifically comprising the following steps:

sending a first instruction to obtain images of internal blades of an engine;

preprocessing the images of the internal blades of the engine to obtain a test dataset, a training dataset, and a validation dataset;

inputting the training dataset into a preset YOLOv5 network model for training, preliminarily evaluating a model effect derived from training by using the validation dataset to adjust the model, testing the model by using a trained weight file and the test dataset, and obtaining an mAP value and a precision-recall (P-R) curve to finally evaluate the model; and obtaining the images of the internal blades of the engine in real time, detecting the internal blades of the engine in real time by using the weight file, and outputting a detection result.

2. The method according to claim 1, wherein the step of preprocessing the images of the internal blades of the engine to obtain a test dataset, a training dataset, and a validation dataset comprises:

performing crack marking, scaling and folding on the images of the internal blades of the engine to expand datasets to obtain the test dataset, the training dataset, and the validation dataset.

3. The method according to claim 1, wherein the preset YOLOv5 network model comprises an input end, a Backbone network, a Neck network, and an output end;

the input end comprises a data enhancement module and an anchor box selection module, wherein the data enhancement module is configured to splice input data in a manner of scaling, cutting and random arrangement, and the anchor box selection module is configured to calculate and update a size of a crack anchor box marked on the images of the internal blades of the engine;

the Backbone network comprises a Focus structure, a Conv+BatchNormalization+LeakyRelu (CBL) structure, a cross stage partial (CSP) structure, and a spatial pyramid pooling (SPP) module;

the Focus structure is configured to obtain the crack image at the input end for slicing and parallel convolution operation, and the CBL structure is configured to extract feature information of the crack image subjected to slicing and parallel convolution operation by the Focus structure;

the SPP module is configured to equally divide a feature mapping of crack image features and perform pooling operation;

the Neck network comprises a feature pyramid network (FPN) structure and a path aggregation network (PAN) structure, wherein the FPN structure and the CBL structure increase a size of a feature map of the crack image, and the PAN structure and the FPN structure perform feature fusion to reduce the size of the feature map of the crack image; and the output end is configured to mark crack information and output confidence to obtain precision and recall.

4. The method according to claim 3, wherein the pooling operation is performed by using the following formula:

$$S_H * S_W = \left\lfloor \frac{h+2p-f}{s} + 1 \right\rfloor * \left\lfloor \frac{w+2p-f}{s} + 1 \right\rfloor$$

wherein $S_H$ is a height of a matrix;
$S_W$ is a width of the matrix;
h is the height of the image;
w is the width of the image;
p is a filling quantity;
f is a filter size; and
s is a stride.

5. The method according to claim 3, wherein the precision is obtained by using the following formula:

$$\text{Precision} = \frac{TP}{TP+FP} = \frac{TP}{n},$$

wherein
n is a total number of recognized images;
TP is a number of correctly recognized images; and
FP is a number of wrongly recognized images;
the recall is obtained by using the following formula:

$$\text{Recall} = \frac{TP}{TP+FN} = \frac{TP}{m},$$

wherein
m is a total number images with a target to be recognized; and
FN is a number of images with a target but not recognized by a system.

6. The method according to claim 5, wherein TP and FP are obtained by using the following steps:
obtaining confidence and Intersection over Union (IOU), wherein the IOU is obtained by using the following formula:

$$IOU = \frac{\text{area } (B_P \cap B_{gt})}{\text{area } (B_P \cup B_{gt})},$$

wherein
$B_p$ is a prediction box; and
$B_{gt}$ is a true box; and
obtaining TP and FP based on the IOU:
if a recognized region has an area greater than an IOU threshold, determining a result as TP, or if the recognized region has an area less than the IOU threshold, determining the result as FP.

7. The method according to claim 6, wherein the mAP value is obtained by using the following formula:

$$AP = \sum_{k=1}^{N} P(k)\Delta r(k),$$

wherein
P is precision;
r is recall; and
the mAP value is a mean of AP values of category features.

8. A YOLOv5-based real-time detection device for blade cracks in aeroengine operation and maintenance, comprising:
an image acquisition instruction sending module, configured to send a first instruction to obtain images of internal blades of an engine;
a sample acquisition module, configured to preprocess the images of the internal blades of the engine to obtain a test dataset, a training dataset, and a validation dataset;
a training test module, configured to input the training dataset into a preset YOLOv5 network model for training, preliminarily evaluate a model effect derived from training by using the validation dataset to adjust the model, test the model by using a trained weight file and the test dataset, and obtain an mAP value and a P-R curve to finally evaluate the model; and
an output module, configured to obtain the images of the internal blades of the engine in real time, detect the internal blades of the engine in real time by using the weight file, and output a detection result.

* * * * *